No. 800,872. PATENTED OCT. 3, 1905.
J. O. NEWCOMB.
HOE.
APPLICATION FILED JUNE 12, 1905.
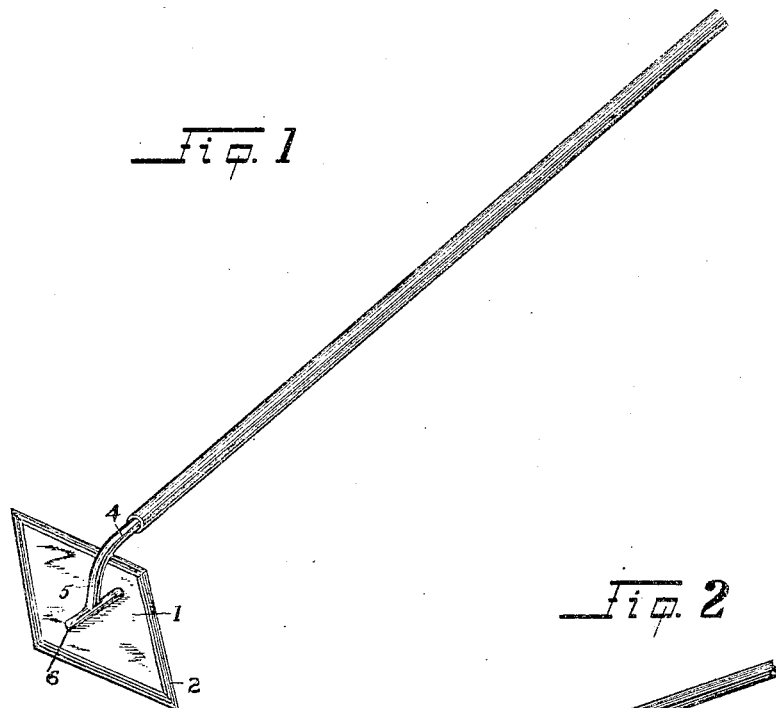
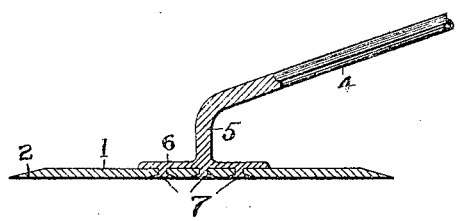
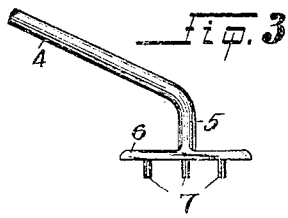
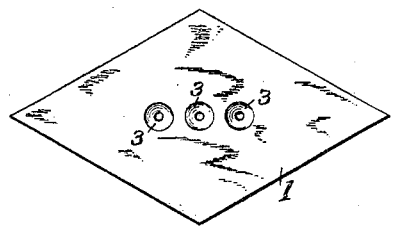
Witnesses
Frank H. Carter.
Percy␣Webster
Inventor
John O. Newcomb.
By Joshua B. Webster
Attorney

UNITED STATES PATENT OFFICE.

JOHN O. NEWCOMB, OF FRENCH CAMP, CALIFORNIA, ASSIGNOR OF ONE-HALF TO HARRY GUSTAFSON, OF FRENCH CAMP, CALIFORNIA.

HOE.

No. 800,872.     Specification of Letters Patent.     Patented Oct. 3, 1905.

Application filed June 12, 1905. Serial No. 264,790.

*To all whom it may concern:*

Be it known that I, JOHN O. NEWCOMB, a citizen of the United States, and a resident of French Camp, county of San Joaquin, State of California, have invented certain new and useful Improvements in Hoes, of which the following is a specification.

My invention relates to improvements in hoes or hand-cultivators, my object being to produce a handy and effective tool by means of which weeding and cultivating may be done easily and effectually. This object I accomplish by the simple arrangement of parts herein fully described, and particularly pointed out in the claims appended.

In the drawings similar characters of reference indicate corresponding parts in all the views.

Figure 1 is a perspective view of my improved hoe and hand-cultivator. Fig. 2 is a sectional view of same. Fig. 3 is a view of a portion of the handle of the tool. Fig. 4 is a bottom plan view of the blade of the tool.

The blade 1 of my improved tool is diamond-shaped and flat on its under side and provided with a sharp cutting edge 2 all around. Near the center are three orifices 3, flaring toward the under side for the purpose as will be shown.

The handle of the tool consists of an oblique portion 4, an upright portion 5, a transverse portion 6 at the lower end of said upright portion, and three lugs 7, extending downward from said transverse portion and adapted to fit into the orifices 3 and be flattened into the flaring portions thereof in order to secure the blade to the said handle. The upright portion 5 permits of the blade being kept always on the ground, and the diamond shape allows the same to be worked to best advantage among the weeds, flowers, or vegetables. The sharp cutting edge 2 cuts the weeds easily and effectually, cutting either forward or backward. I have now entered into a detailed description of the present and preferred embodiment of my invention. I do not wish, however, to be understood as confining myself to such specific construction, as such changes and modifications may be made in practice as fairly fall within the scope of my claims.

Having thus described my invention, what I claim as new and useful, and desire to secure by Letters Patent, is—

1. In a hoe a flat diamond-shaped blade provided with orifices flaring toward the under side thereof, a handle composed of an oblique portion, a vertical portion downward therefrom, a transverse portion at the lower end of said vertical portion, integral lugs on the under side of said transverse portion, said lugs being fitted into said orifices and flattened into the flaring portions thereof, as and for the purpose specified.

2. In a hoe, a handle composed of an oblique portion, a vertical portion extending from said oblique portion, a transverse portion carried by said vertical portion, said transverse portion being formed with three integral lugs, one of said lugs being arranged at the center of said transverse portion and the other two of said lugs being located respectively on opposite sides of said central lug, a flat blade provided with flaring orifices for the reception of said lugs, the ends of said lugs being flattened into said orifices whereby the face of the hoe will present a smooth and regular surface.

In testimony whereof I have signed my name to this specification in the presence of two subscribing witnesses.

JOHN O. NEWCOMB.

Witnesses:
   PERCY S. WEBSTER,
   JOSHUA B. WEBSTER.